Nov. 16, 1965  C. B. MALMEDE  3,217,522
APPARATUS FOR BEADING AND SECURING BOTTOMS
TO BARREL BODIES AND THE LIKE
Original Filed July 2, 1958  4 Sheets-Sheet 2

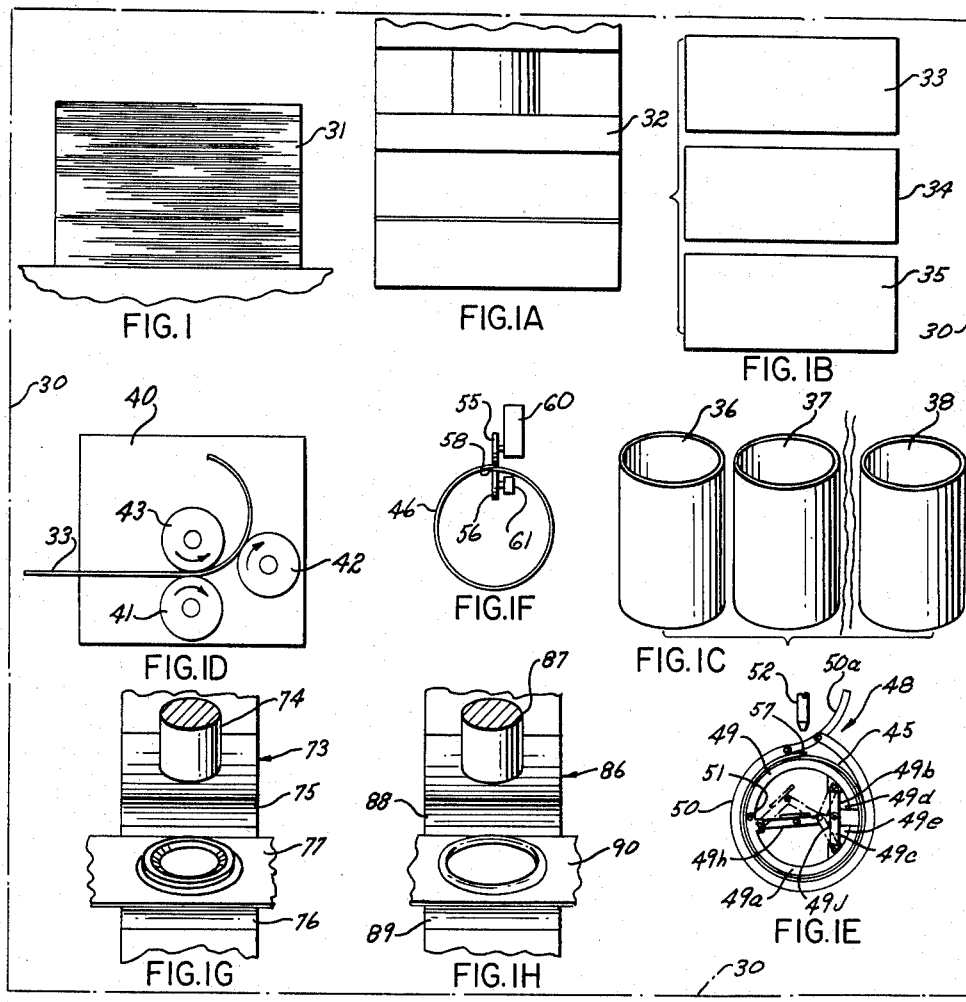

INVENTOR
CLODWIG BELFORD MALMEDE
BY
HIS ATTORNEYS

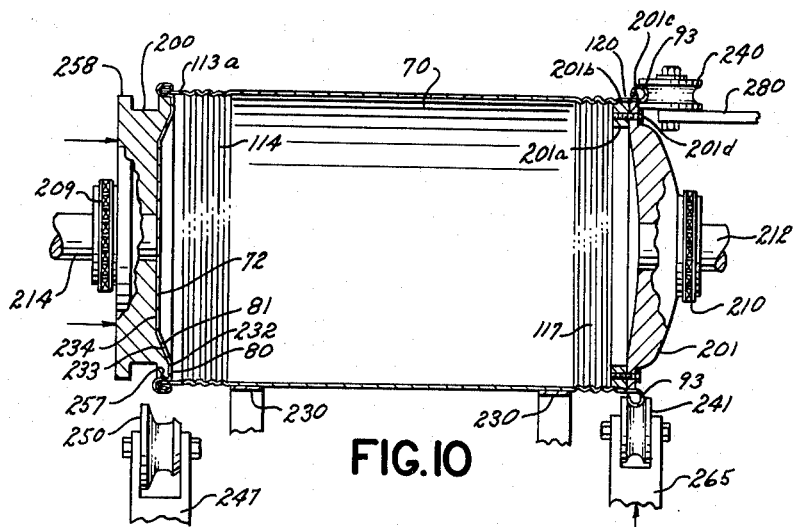
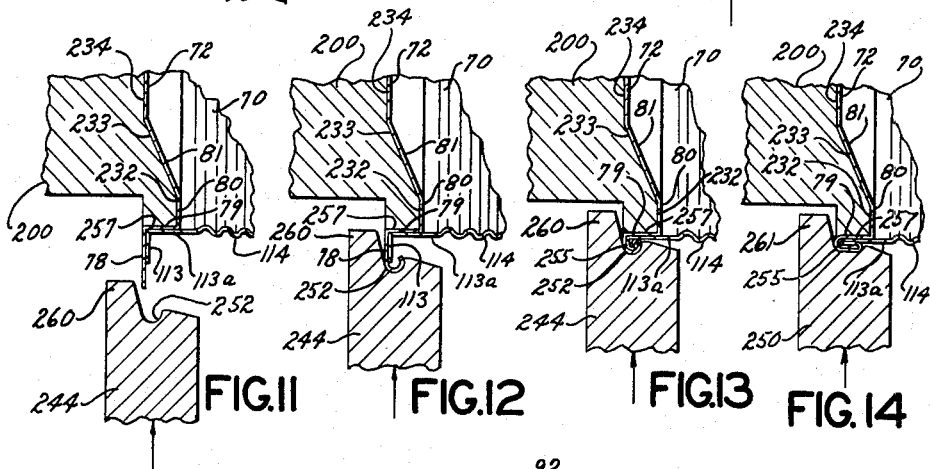
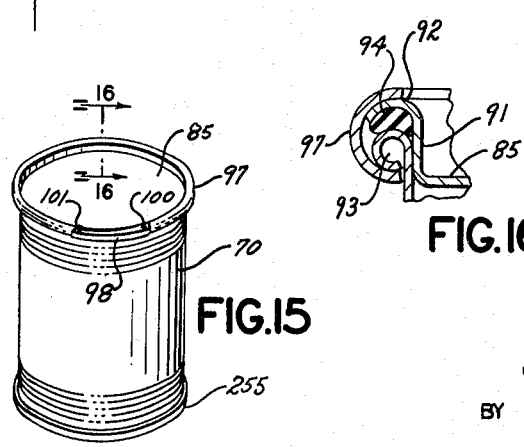
INVENTOR
CLODWIG BELFORD MALMEDE

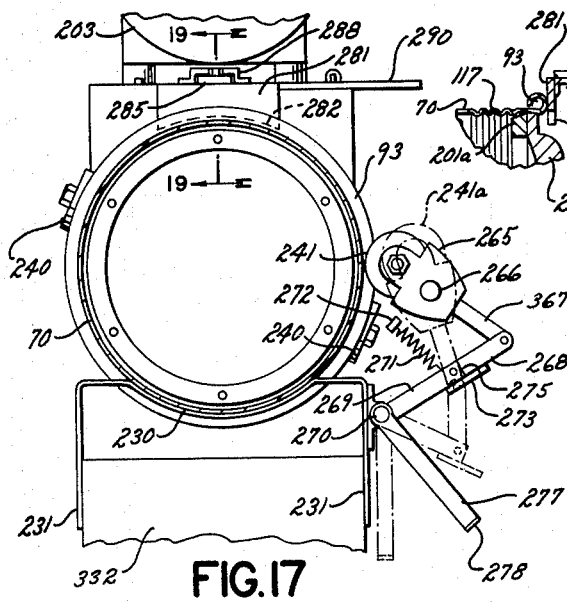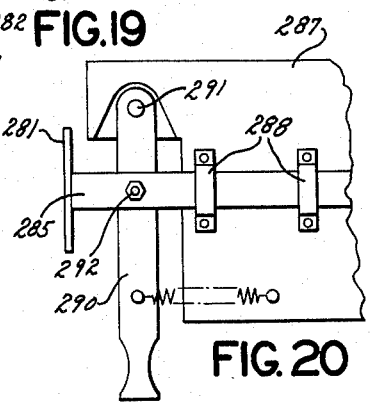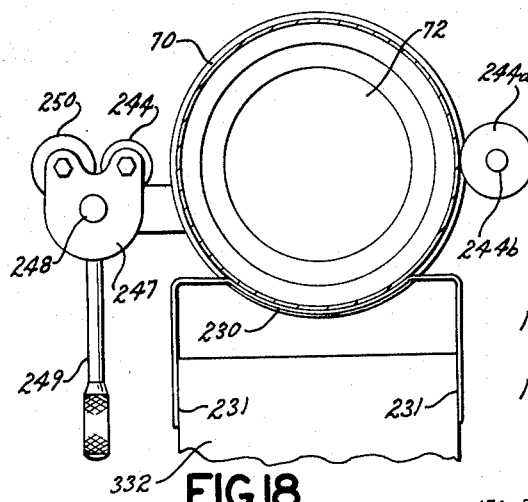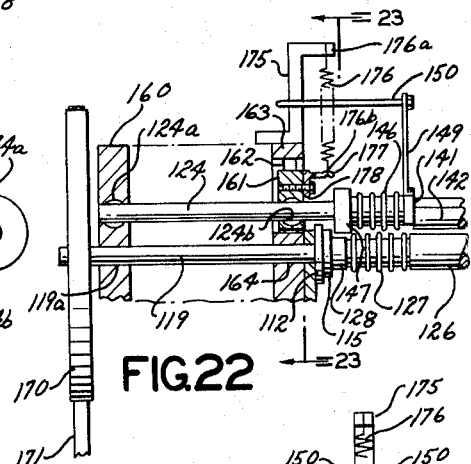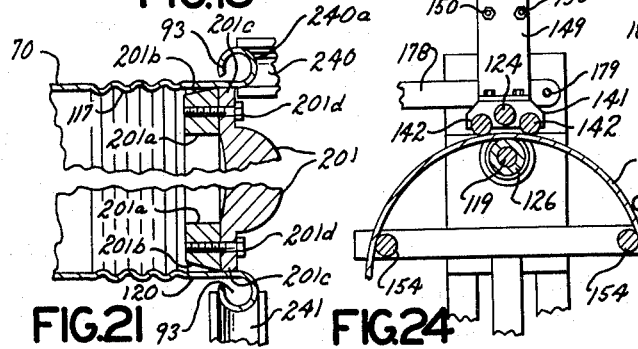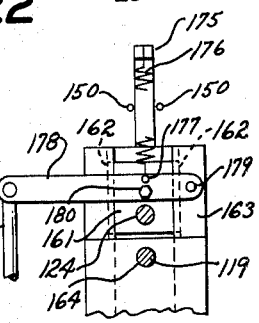
INVENTOR
CLODWIG BELFORD MALMEDE
HIS ATTORNEYS

United States Patent Office 3,217,522
Patented Nov. 16, 1965

3,217,522
APPARATUS FOR BEADING AND SECURING BOTTOMS TO BARREL BODIES AND THE LIKE
Clodwig Belford Malmede, Birmingham, Ala., assignor, by mesne assignments, to Reynolds Metals Company, Richmond, Va., a corporation of Delaware
Original application July 2, 1958, Ser. No. 746,152. Divided and this application July 13, 1962, Ser. No. 209,583
11 Claims. (Cl. 72—87)

At present sheet metal barrels are manufactured in a factory where relatively large, expensive and ponderous machines are used in combination with large quantities of sheet metal. Such factory is equipped to manufacture relatively large quantities of barrels. These barrels are transported from such factory by shipments of relatively small numbers of barrels to a plurality of establishments where such barrels are loaded with commodities, after which the covers, which ordinarily have been transported with the barrels, are then secured on the barrels to retain the commodities within the barrels. Such transportation of these barrels from the factory to the establishments is relatively expensive and harmful to the barrels. The barrels are likely to be dented or otherwise damaged by said transportation and the barrels require large transportation vehicles.

The establishments where commodities are loaded in the barrels do not use a sufficient number of barrels to warrant the expense of providing a barrel factory adjacent such establishments, since such a factory would be too expensive, and its output of barrels would be too large with respect to the requirements of the commodity establishment. The barrels transported from the factory to the establishment take up a relatively large amount of space in the transporting vehicles since they must be placed side by side. Such barrels ordinarily are made of 16–18 gauge sheet metal, in order to prevent them from being unduly caved in and otherwise harmed during transportation.

This invention overcomes the foregoing objections by a method whereby a plurality of cylindrical flexible metal barrel bodies are manufactured from 22–30 gauge sheet metal at a barrel factory, or the like, and are nested within a retaining member, which may itself be one of these cylindrical bodies. The nesting is accomplished by inwardly bulging the sides of these barrel bodies progressively deeper to permit the bodies to be nested within each other, and within the container. A number of these nested bodies are then transported to a commodity establishment. Such nested bodies are then unnested at the commodity establishment. A bottom is secured at one end of said bodies, and other steps may be taken to maintain such bodies in the substantially cylindrical form of an unfilled and uncovered barrel. Commodities are then loaded in such unfilled and uncovered barrels, and covers may be secured to the other ends of the barrels to retain the commodities in the barrels. Such a method reduces very materially the expense of transportation between the barrel factory and the commodity establishment. It also prevents the damage to the barrels which is prevalent in the present method of barrel manufacture and distribution.

This invention also includes relatively simple and inexpensive apparatus to be located and used at the commodity establishment where the commodities are loaded in the barrels. Such apparatus is for the purpose of securing the bottoms of the cylindrical flexible barrel bodies to retain such bodies in cylindrical form and to complete them into unfilled barrels. The apparatus may also perform other steps for rendering the flexible bodies in a firm cylindrical form, and may also include provisions for beading the uncovered end of the barrels more readily to receive the covers which may be secured at that end, after the barrels have been loaded with the commodities.

Hence an object of this invention is to provide apparatus for use at the commodity establishment or other location away from the barrel factory, such apparatus being relatively simple and inexpensive, and which easily and quickly changes the unnested cylindrical flexible barrel bodies into barrels by securing a bottom to one end of said bodies, and which easily performs other steps for rendering said bodies relatively rigid and in cylindrical form.

Other objects of this invention will become apparent as the description proceeds with reference to the accompanying drawings in which:

FIGURE 1 is a side view of a stack of large sheet steel for subsequently forming barrel bodies.

FIGURE 1A is a side view of a press for cutting the large sheets of FIGURE 1 into the smaller rectangular sheets of FIGURE 1B.

FIGURE 1B is a plan view of a plurality of sheets cut by the apparatus of FIGURE 1A.

FIGURE 1C is a perspective view of a plurality of barrel bodies made from the sheets of FIGURE 1B.

FIGURE 1D is a side view of a rolling machine.

FIGURE 1E is an end view of a tack welding machine.

FIGURE 1F is an end view of another tack welding machine.

FIGURE 1G is a fragmentary perspective view of a punch press for forming sheet metal bottoms.

FIGURE 1H is a fragmentary perspective view of a punch press for forming sheet metal covers.

FIGURE 2 is a perspective view illustrating a plurality of barrel bodies of FIGURE 1C nested together.

FIGURE 2A is a cross-sectional view of a stack of barrel bottoms.

FIGURE 2B is a cross-sectional view of a stack of barrel tops or covers.

FIGURE 2C is a perspective view of a stack of sealing rings.

FIGURE 2D is a perspective view of a stack of clamping rings.

FIGURE 3 is a diagrammatic elevation of one of the inexpensive machines (a flanging and corrugating machine) for use at the commodity establishment or the like.

FIGURE 4 is a diagrammatic elevation of the other inexpensive machine (a double-seaming curling machine) for use at the commodity establishment or the like.

FIGURE 9 is a development curve of the cam shown in FIGURE 4.

FIGURE 10 is a diagrammatic cross section, on enlarged scale, of portions of the apparatus shown in FIGURE 4.

FIGURES 11 to 14 show progressive steps in the seaming operation for attaching the bottom of the barrel body.

FIGURE 15 is a perspective view of the completed and covered barrel.

FIGURE 16 is a cross section, on enlarged scale, taken along the line 16—16 of FIGURE 15.

FIGURE 17 is an enlarged cross section, taken along the line 17—17 of FIGURE 4.

FIGURE 18 is an enlarged cross section taken along the line 18—18 of FIGURE 4.

FIGURE 19 is a cross section taken along the line 19—19 of FIGURE 17.

FIGURE 20 is a top plan view of FIGURE 19.

FIGURE 21 is an enlarged cross section, with parts broken away, of a portion of the apparatus shown in FIGURE 10.

FIGURE 22 is an enlarged vertical elevation, partly in cross section, of a portion of the apparatus shown in FIGURE 3.

FIGURE 23 is a cross section taken along the line 23—23 of FIGURE 22.

FIGURE 24 is a vertical cross section of certain parts and taken along the line 24—24 of FIGURE 6.

Figure 3:
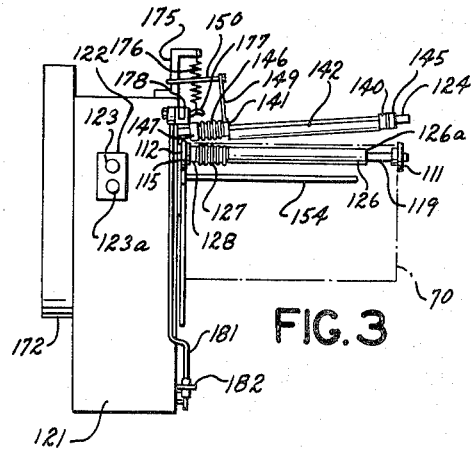

This application is a divisional patent application of the copending patent application, Serial No. 746,152, filed July 2, 1958, now abandoned.

Referring first mainly to FIGURES 1–1H, a factory of the type for manufacturing sheet metal barrels, or parts thereof, contains the supplies, machines, and products diagrammatically shown within the dotted line 30. For example, large quantities of sheet metal, such as sheet steel, are stacked or otherwise stored, as diagrammatically indicated at 31 in FIGURE 1. A large press or other cutting machine 32 of FIGURE 1A cuts the sheets from the stack 31 into a large number of smaller rectangular sheets 33, 34, 35, etc. of FIGURE 1B which are to be rolled and welded into cylindrical sheet metal flexible barrel bodies 36, 37, 38, etc. of FIGURE 1C which are shown on a different scale from that used for sheets 33, 34 and 35. To manufacture the cylindrical barrel bodies 36, 37 and 38 and many more such bodies, the blanks or sheets 33, 34, 35, etc. are fed through a rolling machine 40 of FIGURE 1D to roll the sheets 33, 34 and 35, etc. into cylindrical form. For example, the machine 40 may include a plurality of rolls 41, 42, 43, which roll the sheets 33, 34, 35, etc. into the lapped cylindrical form shown at 45 and 46. In operation, the roll 42 moves up towards roll 43 in order to accomplish the curl in sheets 33, 34, 35, etc., as they are fed between the rolls 41 and 43. If desired, the rolled sheet may be held securely in the proper shape in any tack-welding machine 48 which, merely by way of illustration in FIGURE 1E, may include a vertical or horizontal collapsible drum 49, 49a around which the previously curled sheet 45 from machine 40 may be loosely placed and then tightly held in proper position by a plurality of inwardly movable holding members or rings 50 which may be tightened by handle 50a which hold the sheet 45 in proper shape while it is being tack-welded by the spot welder 52 at a sufficient number of spots temporarily to hold the rolled sheet 45 in correct cylindrical form, later to be seam-welded as indicated at 46 by the seam welding rollers 55 and 56.

The drum 49, 49a, hinged at 51, may be inwardly collapsed by any linkage 49j capable of moving the arcs 49 and 49a inwardly while the tack-welded barrel body 45 is being removed, the collapsed linkage being indicated in dotted lines, and which is returned to the full line position for the next tack-welding operation. Merely by, for example, the toggle levers 49b and 49c are hinged to rightward limiting lugs 49d and 49e and hold the hinged members 49 and 49a in circular form when in full line position. Toggle levers 49b and 49c are collapsed leftward by a second toggle construction 49h when such toggle 49h is raised, and vice versa. Any other tack-welding machine may be substituted, or suitable clamps may be provided, not shown, to hold the body 46 while being seam-welded by rollers 55 and 56 of FIGURE 1F. A lapped joint has been shown at 57 and 58, but it is understood that any other type of joint may be produced, as is well known. The seam welding rollers 55 and 56 may be driven by any suitable motors, transmissions, etc. 60 and 61 of well known construction. The flexible cylindrical barrel bodies produced by the seam-welding operation by rollers 55 and 56 are indicated diagrammatically at 36, 37 and 38, and are representative of a large number of such bodies produced at the factory.

A selected number of these bodies are nested within each other, preferably at the factory, to form the nested collection 65, shown in FIGURE 2. A cylindrical retaining member 66, which preferably is one of the flexible cylindrical bodies 36, etc., receives a plurality of flexible barrel bodies which have been inwardly bulged progressively deeper as diagrammatically indicated at 67, 68, 69 and 70. The progressive bulging has been shown in exaggerated form in FIGURE 2, for the sake of clearness, although it is understood that the progressive bulging leaves very little space between adjacent bodies 67, 68, etc. The bulging may be produced manually, or by any suitable machine, not shown, which produces an initial bulge, as is obvious. Thus a relatively large number of flexible barrel bodies are assembled in the space which originally was occupied by a single barrel body 66, and hence a very large amount of storage and transportation space is saved by the nested assembly 65.

Sheet metal bottoms 72 preferably also are produced in the factory of FIGURES 1–1H, for example, by the punch press 73 of FIGURE 1G which has the plunger 74, movable die 75, and stationary die 76, which are capable of cutting and drawing the bottoms 72 shown in FIGURE 2 from the sheet steel strip 77. The diagrammatic showing of the press 73 may be representative of a plurality of presses or dies which serially act on the strip 77 to cut and draw such sheet metal strip to form the bottoms shown at 72 in FIGURE 2A. Preferably, the bottom 72 has an outer annular flange 78, a cylindrical portion 79, annular offset 80, a downwardly slanting or conical portion 81 and a main flat body portion 72, preferably in the same plane as the flange 78. These bottoms may be stacked or otherwise assembled, as indicated by the line 82, FIGURE 2A, for storage in, and/or transportation from, the barrel factory to the commodity establishment.

Sheet metal covers 85 may also be produced at the factory of FIGURES 1–1H by one or a series of punch presses 86 of FIGURE 1H which may include the plunger 87, movable die 88, stationary die 89, etc., capable of punching out and forming the covers 85 from the sheet metal (steel) strip 90. The covers 85 of FIGURE 2B may include the main flat body, indicated by the numeral 85, the cylindrical portion 91, and the substantially semicircular cross-sectioned bead 92 having a radius of the correct relationship to the radius of the bead or false wire 93 (see FIGURE 16) which is later to be described, and which is produced at one end of the barrel to be described. The radii of beads 92 and 93 preferably permit concentric assembly of such beads 92 and 93.

If desired, flexible sealing rings 94 (FIGURES 2C and 16) may be made at, or purchased by, the factory of FIGURE 1, these sealing rings being made of suitable flexible sealing material, such as rubber, etc. Likewise, the factory may produce or purchase metal sealing or clamping rings 97 (FIGURES 2D and 16), of any well known type, such as the lever-locking type, having a lever 98 hinged at 99 and 100 to the ends of the ring 97 whereby the lever 98 may be moved to lock the ring 97 tightly around the beads 92 and 93, FIGURE 16, to produce a tightly sealed joint between the end of the barrel and the cover 85. If desired, the lever 98 may be locked by a bolt or the like, passing through the openings 101 and 102. Any other type of sealing ring, such as the bolt type, not shown, may be used if desired, for securing the beads 92 and 93 together, with or without the flexible seal ring 94. The covers 85 may be stacked as indicated by a dotted line 103

(FIGURE 2B) for storage and/or transportation of a plurality of covers 85. Likewise, the rings 94 and 97 may be assembled or stacked at 104 and 105, as diagrammatically indicated in FIGURES 2C and 2D for storage and/or transportation.

The foregoing methods and machinery described with respect to FIGURES 1–1H and 2–2D are performed and located at the factory designated in FIGURES 1–1H where the apparatus, supplies, and techniques, etc., are capable of producing large quantities of flexible cylindrical barrel bodies 36, 37 and 38, and of nesting and stacking the products shown in FIGURES 2–2D ready for transportation to the place of use at or near an establishment where the barrel bodies 36, 37 and 38, etc. are first formed into cylindrical, uncovered sheet metal barrels, which may be loaded with any desired commodity and which, if desired, may then be covered as indicated at FIGURES 15 and 16.

The factory of FIGURES 1–1H ordinarily is too large and expensive, and has too large an output to be adjacent to and be limited to supply a single commodity establishment. Instead it is equipped to supply a plurality of commodity establishments with the nested barrel bodies 65, bottoms 72, covers 85, and rings 94 and 97 shown in FIGURES 2–2D by a very reasonable and safe method of transportation.

Previous type barrels are ordinarily made of 16–18 gauge sheet steel, more or less. The flexible barrel bodies 36, 37 and 38, pertaining to this invention, are preferably made of 22–30 gauge sheet steel.

The barrel bodies 36, 37, 38, etc., the bottoms 72, covers 85, and sealing rings 97 may be coated with protective coatings of the character well known in the steel barrel industry, such as zinc and aluminum coatings and/or high bake phenolic or low resin type finishes, depending on the contemplated use of the finished barrels to be described.

The shipment of one or more of the parts shown in FIGURES 2–2D from the factory of FIGURES 1–1H is received at one of the plurality of establishments where barrels are loaded with commodities, or at a place near such establishment. The nested flexible barrel bodies 65, (FIGURE 2) are serially unnested, and finished into uncovered barrels. Such barrels have commodities placed therein and may be covered to retain such commodities in the barrels. The formation of the barrels, and the covering thereof at the commodity establishment or place near such establishment is relatively simple and is illustrated in FIGURES 3 to 24.

Figure 6:
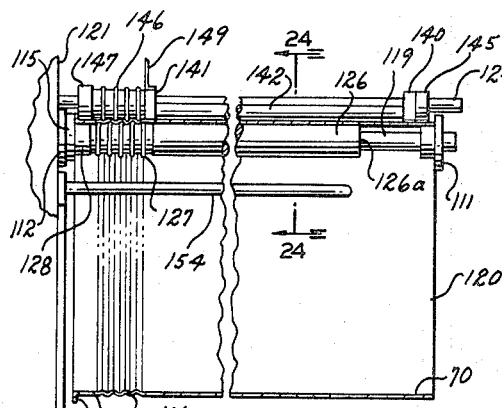
FIGURE 6 shows a further step of the parts of FIGURE 5 in which the barrel body has been flanged and corrugated at one end.
Figure 7:
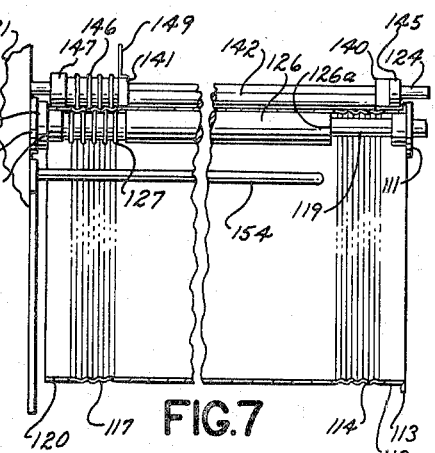
FIGURE 7 is a view similar to FIGURE 6 showing a further step in which the barrel body has been reversed and is being corrugated at the other end.

At the commodity establishment or adjacent place, the nested barrel bodies shown at 65, FIGURE 2, are serially unnested, the innermost one 70 being removed first, etc. The body 70 after it has been unnested, has the greater portion of the bulge removed by holding the apex 110, FIGURE 2, at each end of the body, and snapping the bulge outward, to produce an almost cylindrical barrel body. Such body is placed in the flanging-corrugating machine shown in FIGURES 3, 5, 6, 7 and 22 to 24. The body, 70, and the other bodies 69–66 of the nested bundle 65, are of the correct length to rest between the limiting discs or flanges 111 and 112, FIGURES 3 and 5, preparatory to flanging and corrugating one end of the body in the manner shown in FIGURE 6. The flange 113 and the corrugations 114 are formed in one end 113a of the body 70. Thereafter, such body 70 is removed from the machine and is placed with the ends reversed in the same machine, as indicated in FIGURE 7, where the flange 113 is adjacent the disc 111, and the other end 120 of the body 70 is adjacent the flange or disc 115. The machine, in the position shown in FIGURE 7, is operated to produce the corrugations 117, so the barrel body is formed into a semi-rigid, cylindrical barrel body, shown in reduced scale, in FIGURE 8.

The sleeve 126 terminates at 126a (FIGURE 7) to prevent flattening of corrugations 114 while corrugations 117 are being formed.

Figure 8:
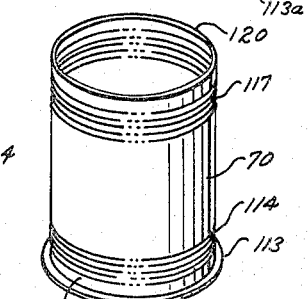
FIGURE 8 is a perspective, on reduced scale, of the barrel body produced in FIGURE 7.

The barrel body 70 shown in FIGURE 8 is then placed in the double-seaming curling machine shown in FIGURES 4, 9 to 14, and 17 to 21. A bottom disc 72 (FIGURE 2A) is secured to the end of the barrel body which has the flange 113, and the other end 120 (FIGURE 8) has the bead or false wire 93 (FIGURE 16) formed therein. These operations produce an open, relatively rigid, cylindrical unfilled barrel, as shown in FIGURE 15, with the cover 85 omitted. The desired commodities are then placed in the open barrel at the establishment.

The cover 85, with or without the seal ring 94, may then be placed on the barrel, with or without the sealing clamp rings 97, as is obvious.

These operations of FIGURES 3 to 24, which have been briefly described, will now be described in further detail.

The flanging and corrugating machine shown in FIGURES 3 to 7 and 22 to 24 includes a power driven shaft 119 driven by a motor, not shown, in the lower part of base 121, such motor being started and stopped by the switch 122 having the starting and stopping push buttons 123 and 123a. The shaft 124 may be an idler shaft. The shaft 119 has a cylindrical sleeve 126, a corrugating roll 127, a second sleeve 128, a third sleeve 129, the flanging disc 115, and the positioning discs 111 and 112. All of these are rigidly secured to the shaft 119.

The shaft 124 has non-rotatable bearing plates 140 and 141 on which a pair of idler rollers 142 are mounted (FIGURE 24). The shaft 124, FIGURE 5, also has the discs 145, corrugating roll 146, and flanging roll 147 rigidly secured to said shaft 124. The plate 141 has a wide flat rod 149 rigidly bolted thereto (FIGURE 24) which in turn is connected to two substantially horizontal rods 150 which straddle the upwardly directed stationary rod 175 and the spring 176 later to be more fully described. The rod 149 and rods 150 prevent the bearing plate 141 from rotating with or around the shaft 124. This maintains the rollers 142 ready to move down on either side of cylindrical sleeve 126 to roll the barrel body 70 into true cylindrical form.

A U-shaped bar 154, FIGURES 5–7 and 24, is supported from any stationary part of the base 121 to maintain the flexible barrel body 70 properly spaced on both sides of the shaft 119.

Referring particularly to FIGURES 22 and 23, the shaft may have a universal bearing 124a on the stationary bearing member 160, FIGURE 22, supported within the base 121 of FIGURE 3. The shaft 124 passes through, and has a universal bearing 124b in the slidable plate 161 which slides within grooves 162 (FIGURE 23) in the stationary upright frame 163 which also has a stationary bearing 164 for the shaft 119. The shaft 119 has a stationary bearing 119a on the bearing member 160, and has a pulley 170 with a chain or belt drive 171 connected to the motor, not shown, in the lower part of the base 121. The wheel or pulley 170 and belt 171 are housed within the protective casing 172, FIGURE 3.

The frame 163, FIGURES 22 and 23, carries an upwardly directed stationary arm 175 to which the spring 176 is connected at its upper end 176a, the lower end 176b being connected to the hook 177 carried by the lever 178 which has a fulcrum bolt 179 in the frame 163, is bolted at 180 to the slidable plate 161, and is connected to the rod 181 which is actuated by the pedal 182 (FIGURE 3). Downward movement of pedal 182 moves the shaft 124 from the position in FIGURES 3 and 5 to the positions of FIGURES 6 and 7 with sufficient force to form the flange 123 and corrugations 114 and 117 in the body 70. When the pedal 182 is released by the operator, the spring 176 raises the lever 178 and the plate 161 and the shaft 124 from the position of FIGURES 6 and 7 to the position of FIGURES 3 and 5, so the barrel body 70 may be inserted or removed.

Figure 5:
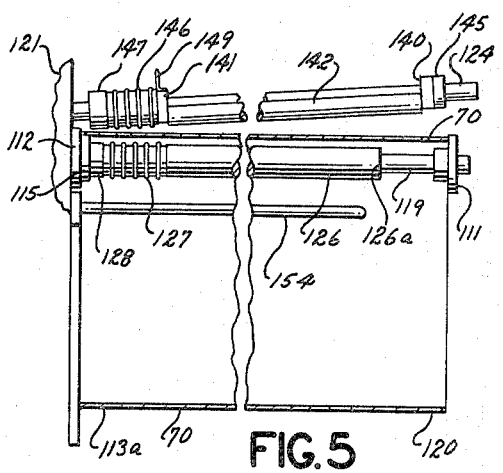
FIGURE 5 is an enlargement of portions shown in FIGURE 3 with the flexible cylindrical barrel body ready to be flanged at one end and corrugated into a relatively rigid cylindrical body.

In the operation of the flanging corrugating machine of FIGURES 3, etc., the operator puts the barrel body 70 in the position shown in FIGURE 5. He starts the motor by pushing the button 123. He lowers the shaft 124 to the position of FIGURE 6 by pushing the pedal 182 down. Rotation of the shaft 119 by the motor produces the flange 113 and the corrugations 114 in the barrel body 70, as shown in FIGURE 6. Thereafter, the operator releases the pedal 182, so shaft 124 raises to the position of FIGURE 3. He then reverses the ends of the body 70 to the position shown in FIGURE 7, after which he lowers the shaft 124 by means of pedal 182, FIGURE 3, to produce the corrugations 117, FIGURE 7, at the other end of the barrel body 70. The flanged and corrugated body 70 is then removed from the flanging corrugating machine by raising shaft 124 and kicking the body 70 out of the machine. Such body 70 has the finished form shown in FIGURE 8. Preferably, the motor driving shaft 119 is not stopped while reversing the barrel body 70 or while removing such body 70 from the machine or while inserting a new body 70 in the machine. Ordinarily the motor is stopped only at the end of the run.

Figure 4:
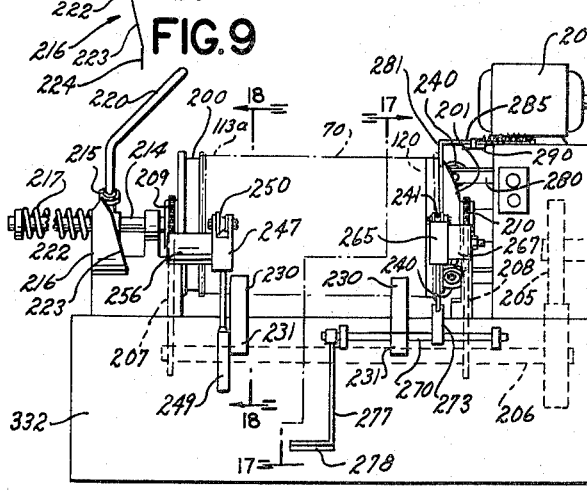

The barrel body shown in FIGURE 8 is then placed in the double-seaming curling machine shown in FIGURES 4, 9, etc., to produce the completed barrel shown in FIGURE 15, with the cover 85 omitted, in a manner now to be more fully described.

The double-seaming and curling machine shown in FIGURES 4, 9 to 14, and 17 to 21 has a combined bottom attaching and seaming disc 200 at one end, and a bead or false wire curling disc 201 at the other end. The discs 200 and 201 are simultaneously driven by the motor 203 (FIGURES 4 and 10) through the belts 204 and 205, the shaft 206, the chains 207 and 208 and sprocket wheels 209 and 210. The shaft 212 (FIGURE 10) of the disc 201 is axially fixed, by any suitable thrust bearing construction, to maintain the disc 201 in the same plane throughout the operation. The shaft 214 of the disc 200 is movable rightward from the position shown in FIGURES 4 and 10 by the action of the roller 215 on the cam 216, which is stationary, to move the shaft 214 and disc 200 rightward against the compression spring 217 by the manual downward movement of the handle 220, which is fixed in the shaft 214 and carries the roller 215. The cam 216 preferably has three different "curve" sections, as indicated by the development curve shown in FIGURE 9. The top slanting surface 222 has a relatively large pitch, so the initial downward movement of the wheel 215 produces a relatively fast movement rightward of the shaft 214 and disc 200 during the time that the bottom 72 is being telescoped within the end 113a of the barrel body 70. The portion 223 has a less pronounced pitch, during which the shaft 214 and disc 200 are moved at less speed, and with greater power, during the time that the bead or false wire 93 is being formed at the other end 120 of the barrel body 70 adjacent the disc 201. The vertical, or slightly backward surface 224 of cam 216 holds the shaft 214 and disc 220 locked stationarily with respect to axial movement, in position to perform the seam forming and flattening steps shown in FIGURES 11 to 14 inclusive. During this time, the lever 220 automatically remains in its lowest position because it is engaging the straight portion of the cam 224, so the seam forming operations of FIGURES 11 and 14 may be performed without holding the lever 220.

When a barrel is to be made, a barrel body 70 as shown in FIGURE 8 is placed on the supporting arch members 230, FIGURES 4, 10, 17 and 18, which have their ends 231 supported or secured to the base 332 of the machine. The flange 113 of body 70 is placed adjacent the disc 200, and the unflanged end 120 is placed adjacent the disc 201. A bottom 72, as shown in FIGURE 2A, is placed in the machine between the flange 113 and the disc 220 while such disc is in its farthest leftward position. The disc 200 has a cylindrical surface 257 (FIGURE 11) which matches cylindrical surface 79 of bottom 72 (FIGURES 2A and 11). The disc 200 also has an annular surface 232, a slanting surface 233, a large flat portion 234 which match respectively the flat annular portion 80, the slanting surface 81 and the flat portion 72 of the bottom. The annular flange 78 of the bottom 72 is substantially twice as wide as the flange 113 of the barrel body 70 (see FIGURE 11). The bottom 72 is engaged against the flange 113 and telescopes within the end 113a of the body 70 by the first movement of the ring 215, FIGURE 9, along the surface 222 of the cam 216. Thereafter, during the movement of the roller 215 along the surface 223, the bead or false wire 93 is formed at the other end 120 of the barrel body 70 by the rollers 240 and 241, adjacent the disc 201, FIGURES 10 and 21, such curling operation being completed when the wheel 215, FIGURES 4 and 9, meets the vertical portion 224 of the cam 216.

When the handle 220 and roller 215 have reached the cam surface 224, FIGURE 9, the flange 113 and annular flange 78, FIGURE 11, are in proper alignment with the first seam forming wheel 244, FIGURES 11 and 18. The wheel 244 is moved and carried by a block 247, FIGURES 4 and 18, which is pivoted about a stationary shaft 248 and has a handle 249 by which the wheel 244 can be moved toward the flange 113 and annular flange 78 of bottom 72 from the position shown in FIGURE 11 to the positions shown in FIGURES 12 and 13. At the position shown in FIGURE 13, the wheel 244, FIGURE 18, can be moved clockwise in an arc about the shaft 248 to bring the wheel 250 into engagement with the seam 255, as shown in FIGURE 14, to flatten the seam 255 previously made by the steps shown in FIGURES 11, 12 and 13. The wheel 244 has a groove 252 adapted first to curl the annular flange 78, as shown in FIGURE 12, and thereafter to curl both the flange 78 and the flange 113 about each other to form the unflattened seam 255 as shown in FIGURE 13. Thereafter the wheel 250 which is brought into engagement by turning the handle 249 clockwise in FIGURE 18, further to flatten the seam at 255 and to seal the same as shown in FIGURE 14. If desired, a thin rubber strip or other sealing material, not shown, may be incorporated within the seam 255 as it is being formed in FIGURES 11, 12 and 13. Such sealing material may be flexible solid material, or semi-liquid material, as is well known. The shaft 248, FIGURE 18, is carried by a bearing member or supporting member 256, FIGURE 4, which is supported by some stationary member supported by the base 332 of the machine. The flange 257 of the ring 200, FIGURE 11, is substantially the same width as the cylindrical portion 79 of the bottom member 72, so the extension 260 of the wheel 244 may pass beyond the flange 257, as shown in FIGURE 13, to complete the curling operation. Likewise, the extension 261 of the wheel 250, FIGURE 14, can pass beyond the flange 257 to flatten the seam, as shown at 255.

A backing wheel or pulley 244a, FIGURE 18, is rotatably mounted about the stationary shaft 244b, which shaft 244b is mounted on a firmly supported stationary part of the machine. The backing wheel 244a engages the flange 258, FIGURE 10, of disc 200, and prevents any undue strain on the shaft 214 when the wheels 244 and 250, FIGURES 11 to 14, are moved against the seam 255 being formed at the bottom of the barrel.

The formation of the bead 93 at the end 120 of barrel body 70 adjacent the disc 201 is accomplished by the detailed structures shown in FIGURES 10, 17 and 21. A plate 265, FIGURE 17, is pivoted on the shaft 266 carried by a stationary block 267, FIGURE 4. The final curling wheel 241 is mounted partially within the block 265, in a position relative to the disc 201, as shown in FIGURES 4, 10 and 21. The block 265 is rotated clockwise, FIGURE 17, by a lever 367 which is attached to a pivoted link 268 which in turn is pivoted to the end of another link or lever 269 which is fixedly secured to the rotatable shaft 270. The lever 269 is pulled upwardly by the tension spring 271 connected to the lever 269 and to a stationary block 272 mounted on a stationary part of the machine. A limiting plate 273 is welded to the lever 269 and loosely bears upwardly against the lever or link 268 in the full line position of FIGURE 17 to prevent further upward movement of the levers 268 and 269. The joint 275 between the levers 268 and 269 may be moved downwardly into the dotted line position by the clockwise movement of the lever 277, fixed to the shaft 270, and to the pedal 278. Clockwise actuation of pedal 278 produces the dotted line position of FIGURE 17. Such clockwise movement of the shaft 270 moves the curling wheel 241 to the dotted line position 241a in FIGURE 17 from which position it may be returned to the original full line position by the action of spring 271 when the pedal 278 is released. The dotted line position 241a is used when it is desired to remove the completed barrel from the machine. This is evident from FIGURES 21 and 10, which show that the barrel cannot be moved leftward to clear the disc 201 and ring 201a until the wheel 241 has been moved away from the bead 93.

The diametrically opposed primary curling wheels 240, FIGURES 4, 10 and 17, are rotatably mounted on the flat rods 280, FIGURE 10, mounted on a stationary member of the machine.

The disc 201, FIGURE 21, has a ring 201a bolted thereon by bolts 201d. The ring 201a has a slanting or conical surface 201b to guide the end 120 of the barrel body into nesting engagement with the cylindrical surface 201c of the disc 201.

A pushing or barrel releasing plate 281, FIGURES 4, 17, 19 and 20, has a circular lower edge 282, FIGURE 17, which normally rests just to the right, FIGURES 4 and 19, of the bead 93 of the finished barrel. The plate 281 may be manipulated leftward, FIGURES 4, 19, and 20 to force the bead 93 and the entire barrel so the same may be removed from the machine when the disc 200 is moved leftward by upward movement of lever 220, FIGURE 4. The disc 200 is moved to its most leftward position by spring 217, thus allowing the completed barrel to be lifted upward between the discs 200 and 201 after the same has been loosened with the aid of the pushing plate 281.

The pushing plate 281 is carried by a longitudinally slidable flat rod 285 and brace 286, FIGURES 19 and 20. The rod 285 is slidably mounted on the stationary shelf 287, FIGURES 19 and 20, and a plurality of flat U-shaped clamps 288 bolted on the shelf 287, which slidably hold the rod 285. A hand-operated lever 290 is pivotally mounted at 291, by a bolt or the like, on a sunken stationary part of shelf 287, and is pivotally connected at 292 with the rod 285 so leftward manipulation of the rod 290, FIGURE 20, forces the pusher plate 281 leftward, FIGURES 20, 19 and 4, to force the bead 93 and the finished barrel leftward out of the disc 201, so the barrel may be moved upwardly out of the machine.

In operation of the double seaming, curling machine shown in FIGURES 4, 9 to 14, and 17 to 21, the flanged and corrugated body 70, shown in FIGURE 8, is placed between the spread apart discs 200 and 201, FIGURE 4. Such body 70 loosely rests on the arch supports 230 when the discs 200 and 201 are relatively far apart as the shaft 214 is retracted by the compression spring 217 when the handle or lever 220 is in its uppermost position. A barrel bottom 72, as shown in FIGURE 2A, is then telescoped into the flanged end 113a of the body 70 and the disc 200 is moved rightward by the downward movement of the lever 220, causing the wheel 215 to travel on the cam 216 quickly along the slanting portion 222 of the cam 216, FIGURE 9, thoroughly to telescope the cylindrical part 79 of the barrel bottom 72 into the end 113a, FIGURE 11, of the body 70. Further rightward movement of the disc 200 by further downward movement of the lever 220 and wheel 215 along the more gently slanting portion 223 of cam 216, causes the disc 200 to force the bottom 72 and the body 70 rightward to force the open end 120 of barrel body 70, FIGURE 8, about the ring 201a and cylindrical edge 201c of disc 201. The ring 201a has a slanting or conical face 201b, FIGURE 21, which guides the end of the end 120 of body 70 around the cylindrical part 201c and against the first set of curling rolls or wheels 240 which have a groove 240a to form the initial curling operation, as indicated in FIGURE 21. Further rightward movement of the body 70 causes the initial curl to engage the final curling wheel 241 when it has been moved to its inward full-line postion of FIGURES 17 and 21, to form the final bead 93. These operations complete the formation of an open empty barrel similar to that shown in FIGURE 15 with the cover 85 omitted. The barrel is released from the machine by actuation of levers 220 and 290, and pedal 278, as previously described.

Unfilled and open barrels are adapted to receive commodities at the commodity establishment located in the neighborhood where the barrels are made, after which the cover 85, with or without the seal 94, is placed over the barrel, and, if desired, the clamping ring 97 is clamped and locked to close and seal the barrel.

It is to be seen that original cylindrical barrel bodies, 36, 37, and 38, FIGURE 1C, may be efficiently and cheaply made at the factory of FIGURES 1–1H, by the steps diagrammatically indicated thereon, after which these bodies may be nested as indicated at 65, FIGURE 2. The operations for making the cylindrical bodies 36, 37 and 38 and the nesting thereof at 65, to be efficient, require expensive machinery and relatively large stocks of sheet steel, which normally cannot be economically maintained at an establishment where commodities are loaded in barrels. The nested assembly or assemblies 65, with or without the barrel bottoms 72, covers 85, seals 94, and clamping rings 97, as shown in FIGURES 2–2D, are economically transported from the factory of FIGURES 1–1H to a commodity establishment, or to a place within its neighborhood from which the finished barrels may be easily moved, where the bodies 66 to 70 (ordinarily of much greater number and more closely assembled than the showing in FIGURE 2) are serially unnested and are formed into relatively rigid, cylindrical barrel bodies having a flange 113 and corrugations 114 and 117, as shown in FIGURE 8, this being done by the relatively inexpenesive flanging and corrugating machine shown in FIGURES 3, 5 to 7, and 22 to 24. Thereafter, the flanged and corrugated barrel body of FIGURE 8 has the bottom 72 attached thereto at the flanged end 113a, and has the bead or false wire 93 formed at the other end 120 in the relatively inexpensive double seaming and curling machine shown in FIGURES 4, 9 to 14, 17 to 21.

Barrels made and filled with commodities, including transportation of the parts thereof, are much cheaper and less easily damaged than the previous, relatively heavy barrels which were made in complete form at a barrel factory and transported in empty condition to the commodity establishment. Such previous barrels, when transported in empty condition, were likely to be caved or bulged in, and required relatively large transportation vehicles, since no nesting of such previous barrels during transporation was possible.

While the form of the invention now preferred has been disclosed as required by the statutes, other forms may be used, all coming within the scope of the claims which follow.

What is claimed is:

1. An apparatus for attaching a barrel bottom to the flanged end of a flanged cylindrical barrel body and for beading the other end of said barrel body comprising a barrel bottom attaching disc adapted to hold a flanged barrel bottom to said flanged end of said barrel body, a bead forming disc receiving the other end of said barrel body and engaging an entire annular portion of the internal peripheral surface of said barrel body, a beading roll construction cooperating with said bead forming disc to form a bead on said other end of said barrel body, and a seam forming roll construction cooperating with said bottom attaching disc to seam said barrel bottom flange and said barrel body flange together.

2. An apparatus for attaching a barrel bottom to the flanged end of a flanged cylindrical barrel body and for beading the other end of said barrel body comprising a barrel bottom attaching disc adapted to hold a flanged barrel bottom to said flanged end of said barrel body, a bead forming disc receiving the other end of said barrel body and engaging an entire annular portion of the internal peripheral surface of said barrel body, a beading roll construction cooperating with said bead forming disc to form a bead on said other end of said barrel body, said beading roll construction including a first roll and a second roll, said first roll having its rotational axis disposed perpendicularly to the longitudinal axis of said barrel body, said second roll having its rotational axis disposed parallel to the longitudinal axis of said barrel body, and a seam forming roll construction cooperating with said bottom attaching disc to seam said barrel bottom flange and said barrel body flange together, said seam forming roll construction including a third roll and a fourth roll, said third roll curling said flanges together, said fourth roll flattening said curled flanges against said barrel body.

3. An apparatus as set forth in claim 2 wherein said discs rotate said barrel body relative to said rolls.

4. An apparatus for attaching a barrel bottom to the flanged end of a flanged cylindrical barrel body and for beading the other end of said barrel body comprising: an axially movable barrell bottom attaching disc adapted to receive a flanged barrel bottom and to telescope said bottom in said flanged end; a bead forming disc spaced from said attaching disc and adapted to receive the other end of said barrel body; a beading roll construction cooperating with said bead forming disc to form a bead on said other end of said barrel while said bottom attaching disc is moving toward said bead forming disc; and a seam forming and flattening roll construction cooperating with said bottom attaching disc to form and flatten a seam from said barrel bottom flange and said barrel body flange.

5. An apparatus for attaching a barrel bottom to the flanged end of a flanged cylindrical barrel body and for beading the other end of said barrel body comprising: a movable barrel bottom attaching disc adapted to receive a flanged barrel bottom and to telescope said bottom in said flanged end; a bead forming disc spaced from said attaching disc and adapted to receive the other end of said barrel body; manually actuated means producing relative axial movement between said discs; a beading roll construction cooperating with said bead forming disc to form a bead on said other end of said barrel while said bottom attaching disc is moving toward said bead forming disc; pedal actuated means for retracting a portion of said beading roll construction; and a manually movable seam forming and flattening roll construction cooperating with said bottom attaching disc to form and flatten a seam from said flanges of said barrel bottom and said barrel body flange.

6. An apparatus for beading an end of a barrel body comprising a bead forming disc telescopically receiving said end of said barrel body, means for axially moving said barrel body relative to said disc, and a beading roll construction cooperating with said disc to form a bead on said end of said barrel body while said barrel body is axially moving relative to said disc.

7. An apparatus as set forth in claim 6 wherein said roll construction includes a roll mounted on an axis disposed perpendicularly to the longitudinal axis of said barrel body.

8. An apparatus as set forth in claim 6 wherein said roll construction includes a roll mounted on an axis disposed parallel to the longitudinal axis of said barrel body.

9. An apparatus as set forth in claim 6 and including means to rotate said barrel body about its longitudinal axis.

10. An apparatus as set forth in claim 9 wherein said rotating means includes said bead forming disc.

11. An apparatus for beading an end of a barrel body comprising a bead forming disc telescopically receiving said end of said barrel body, a first roll disposed adjacent said end of said barrel body and having its axis of rotation disposed perpendicularly relative to the longitudinal axis of said barrel body, means for axially moving said barrel body relative to said disc to cause said first roll to at least partially form said bead at said end of said barrel body, and a second roll movable toward and away from said disc to complete said bead, said second roll having its rotational axis disposed parallel to the longitudinal axis of said barrel body.

References Cited by the Examiner

UNITED STATES PATENTS

| | | | |
|---|---|---|---|
| 359,857 | 3/1887 | Farner | 113—23 |
| 848,296 | 3/1907 | Dugan | 113—7 |
| 1,275,867 | 8/1918 | Davis | 113—23 |
| 2,040,785 | 5/1936 | Esch | 113—23 |

FOREIGN PATENTS

| | | |
|---|---|---|
| 2,193 | 11/1915 | Great Britain. |
| 305,512 | 2/1929 | Great Britain. |

CHARLES W. LANHAM, *Primary Examiner.*

MICHAEL V. BRINDISI, *Examiner.*